Nov. 7, 1961 K. C. NICHOLSON ET AL 3,007,989
PROCESS AND APPARATUS FOR MEASURING HIGH TEMPERATURES
Filed Nov. 10, 1958
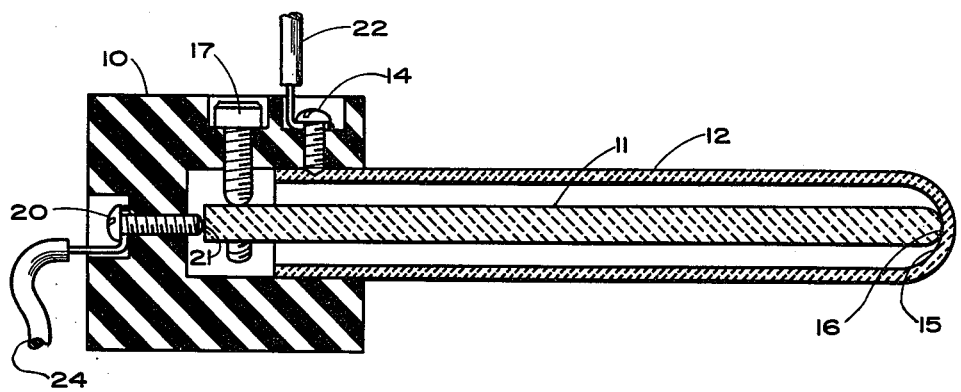
FIG. 1
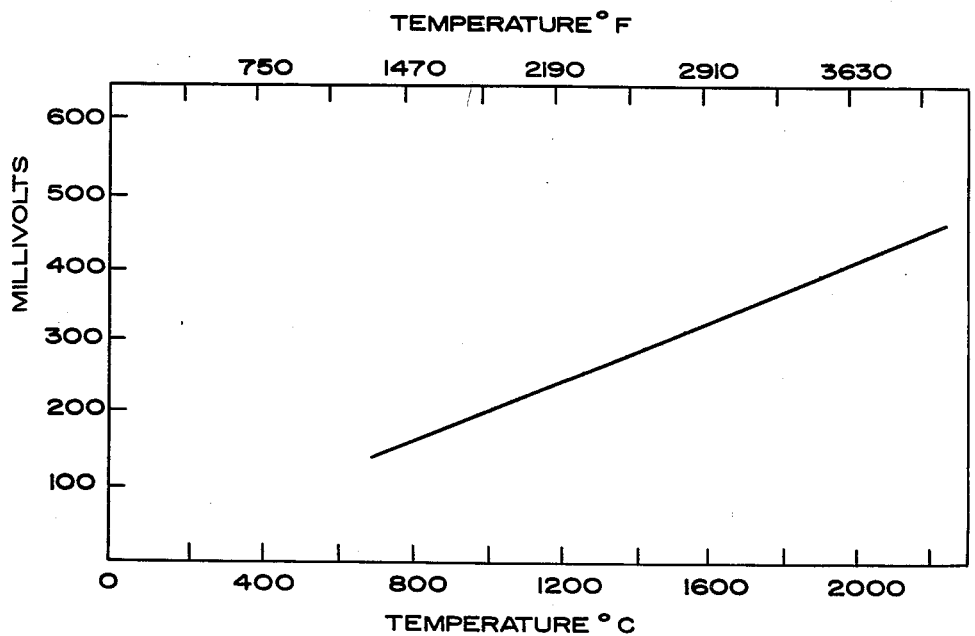
FIG. 2
INVENTORS
KENNETH C. NICHOLSON AND
ROGER C. EMANUELSON
BY
ATTORNEY 3,007,989
PROCESS AND APPARATUS FOR MEASURING HIGH TEMPERATURES
Kenneth C. Nicholson, Niagara Falls, and Roger C. Emanuelson, Grand Island, N.Y., assignors to The Carborundum Company, Niagara Falls, N.Y., a corporation of Delaware
Filed Nov. 10, 1958, Ser. No. 773,067
9 Claims. (Cl. 136—4)

This invention relates to a thermocouple that has thermoelectric elements that are composed of oxidation-resistant refractory materials, for measuring very high temperatures.

High temperature thermocouples are limited to surroundings that will not seriously affect their thermoelectric stability. This severely limits the number of materials that can be employed for many applications. For example, with the exception of elements in the platinum group, all metals are excluded from use in high temperature thermocouples in oxidizing atmospheres; and in a strongly reducing environment, of the metals, only tungsten, molybdenum, and rhenium show the requisite chemical inertness.

In the past when the environment has not been compatible with the thermoelectric elements, hermetic refractory enclosures, such as protection tubes, have been employed, often in conjunction with an inert gas. The use of protective structures has the disadvantage that when temperature fluctuations are rapid, the thermocouples are too sluggish to reproduce the temperature-time relations accurately. Only three non-metallic materials have found acceptance in the construction of high temperature thermocouples, namely, graphite, silicon carbide, and boron carbide. A graphite-silicon carbide thermocouple has been suggested for measuring the temperature of molten iron and steel. This thermocouple comprised a silicon carbide rod set coaxially in a closed-end graphite tube. However, the calibrations of this type of thermocouple and its thermoelectric output are particularly sensitive to the moisture content and composition of the graphite element. Moreover, when taking immersion temperature measurements in a molten metal bath, the graphite tube had to be protected from attack by liquid slag and by air, by a protective layer of clay or a clay-graphite mixture. This protective layer reduced the heat transfer and slowed the rate of response of the thermocouple. For the foregoing reasons the graphite-silicon carbide thermocouple has not been widely accepted.

One object of the present invention is to provide a high temperature thermocouple that has its thermoelectric elements composed of oxidation-resistant refractory materials, and that has a stable thermoelectric characteristic.

Another object of the invention is to provide a high temperature thermocouple that is more resistant to high temperatures than metallic couples and that can be used to measure higher temperatures in corrosive environments than metallic couples.

Another object of the invention is to provide a high temperature thermocouple made from oxidation-resistant refractory materials, and that is resistant to corrosive, erosive, and oxidizing conditions.

Another object of the invention is to provide a high temperature thermocouple made from oxidation-resistant refractory materials and that has a very high electromotive force, good sensitivity, and relatively simple design.

Still another object of the invention is to provide a thermocouple of the character described that is consistent in its readings over long periods of time, so that frequent calibration checks are unnecessary.

Other objects of the invention will be apparent hereinafter from the specification and from the recital of the appended claims.

We have discovered that the thermoelectric elements of a thermocouple can be made entirely from silicon carbide, by using different types of silicon carbide, having different thermoelectric characteristics, for the two elements.

We have found that some types of silicon carbide produce positive voltages with respect to graphite, at temperatures above room temperature, when thermocouples are made using graphite and these silicon carbides. That is, when a potentiometer is used to measure the millivolt readings of the silicon carbide-graphite couple, the lead wire from the silicon carbide element must be connected to the positive terminal of the potentiometer, and the graphite lead wire must be connected to the negative terminal of the potentiometer, in order to obtain a reading. Other types of silicon carbide produce negative voltages with respect to graphite at temperatures above room temperature. That is, the lead wire from this type of silicon carbide must be connected to the negative terminal of a potentiometer, and the lead wire from the graphite must be connected to the positive terminal of the potentiometer, in order to obtain a reading.

We have found that a thermocouple that is constructed with one element of a silicon carbide that produces a positive voltage relative to graphite at temperatures above room temperature, and a second element of a silicon carbide that produces a negative voltage relative to graphite at temperatures above room temperature, produces a considerable electromotive force when their hot junction is heated. The thermoelectric voltages that are produced by this couple are sufficiently high to enable the couple to be used for measuring high temperatures effectively.

We have also found that the thermoelectric characteristics of silicon carbide depend on the method by which it is manufactured. For example, by careful control of the manufacturing and processing steps in the production of different batches or furnace runs of silicon carbide, a plurality of batches of silicon carbide can be produced that have different thermoelectric characteristics. Thus, there are a plurality of silicon carbides of recognizably different physical characteristics that have different positive thermoelectric characteristics, relative to graphite at temperatures above room temperature, and similarly, there are a plurality of silicon carbides of recognizably different physical characteristics that have different negative thermoelectric characteristics relative to graphite at temperatures above room temperature.

We have also found that a thermoelectric force is developed between two silicon carbide thermocouple elements, if one of the elements is more positive or more negative in its thermoelectric characteristics, with respect to graphite, than the other element.

While we believe that the presence of retain trace elements, introduced during the manufacture of silicon carbide, may control the thermoelectric characteristics of the silicon carbide, in general, if a manufacturing process for producing silicon carbide is standardized and is followed rigidly, the thermoelectric characteristics of the silicon carbide produced are fairly consistent. The manner in which a particular type of silicon carbide is made into a thermocouple element, including such factors as processing temperature, recrystallizing steps, and the like, also have a direct influence on the thermoelectric characteristics of a silicon carbide element.

In the drawing:

FIG. 1 is an axial section of a thermocouple constructed according to one embodiment of this invention, in which both elements are made of silicon carbide, and FIG. 2 is a calibration curve for this thermocouple.

Referring to FIG. 1, 10 denotes a generally cup-shaped base that holds the thermocouple elements in assembled, operative relation. One element 11 of this thermocouple is a rod of silicon carbide that has a negative thermoelectric characteristic relative to graphite and that is set coaxially in a closed-end tube 12 of silicon carbide that has a positive thermoelectric characteristic relative to graphite. The open end of the tube 12 is inserted in the bore of the base 10, and one or more setscrews 14 engage against the side of the tube 12 to hold it in an axially-fixed position relative to the base 10. The closed-end face of the tube 12 is rounded as denoted at 15, and the tip 16 of the rod 11 is also rounded, about a radius of considerably smaller size than the radius of the rounded inside surface 15 of the tube 12, so that the rod, at its tip end, tends to be centered in the tube 12. Three radially-spaced centering screws 17 are threaded in the base 10, to hold the rod 11 in centered relation to the tube 12 at the base end of the rod. A screw 20 is mounted on the base 10 for engagement against the flat end face 21 of the rod 11, to exert an adjustable axial pressure against the rod 11 to press the tip 16 of the rod against the curved inner surface 15 of the tube.

The leads 22 and 24 of the thermocouple are connected respectively to the screws 14 and 20. These leads can be connected to an indicating meter in the conventional manner.

To use the thermocouple, the closed end of the tube 12 is placed at or as close as possible to the point at which a temperature measurement is desired. Response is very rapid and a reading can be taken within a few seconds.

*Example 1*

A thermocouple constructed according to a preferred embodiment of the invention is made in the following manner.

To make a closed end tube 12 of dense silicon carbide, that has a positive thermoelectric characteristic relative to graphite, at temperatures above room temperature, we prefer to follow the teachings in the patent application of James C. Andersen, Serial No. 678,017, filed August 13, 1957 now Patent No. 2,938,807. This process involves forming a substantially homogeneous mixture of granules of silicon carbide, a carbonaceous material such as, for example, graphite, and a carbonizable material, such as phenol-formaldehyde temporary binder. In making this mixture, the total amount of carbon in the carbonaceous material and in the carbonizable material is carefully controlled to fall within the range between about 85% and about 95% of the stoichiometric amount that is required to react with free silicon to form sufficient silicon carbide to form a completely solid tube of silicon carbide from a tube shape that is formed from the mixture. Thus, a total carbon content of 90% of this stoichiometric amount produces excellent results.

The homogeneous mixture is compacted and extruded in tubular form. The tube shape is then fired, and as the temperature is raised gradually during firing, the temporary binder is set to hold the mixture in tubular shape until it becomes self-bonded. As the temperature is raised further to the range between about 1850° C. and below the decomposition temperature of silicon carbide, the tube is maintained in contact with more than sufficient silicon to react with all the carbon that is available from the carbonaceous material and from the decomposition of the carbonizable material. Tubes that are made following these general procedures usually have densities of at least 3.0 gms./cm.$^3$; and when care is exercised, the density will approach the theoretical density of silicon carbide—which is 3.22 gms./cm.$^3$.

Thus, to make a closed end tube, the following is placed in a tumbling drum:

|  | Parts by weight |
| --- | --- |
| Silicon carbide, 1000 grit mesh size; particle size range 2 to 20 microns, average size about 7 microns | 72.2 |
| Graphite powder, approximately 10 microns and finer | 8.0 |
|  | 80.2 |

The silicon carbide is a high purity type, of light yellowish-green color of highly regular crystalline habit, and of characteristically fine particle size.

The silicon carbide granules and the graphite are tumbled to obtain a homogeneous dry mixture. Then, 19.4 parts by weight of a liquid phenol-formaldehyde condensation product, 5.0 parts by weight of gum tragacanth, and 5.0 parts by weight of dibutyl phenylphenol sodium disulfonate, a wetting agent sold under the trademark "Aresklene," are blended in with the dry ingredients. This wet mixture is then extruded to form a tube. The shape is then fired in contact with free silicon, at about 2250° C., in an inert atmosphere. The tube that is obtained in this manner characteristically has a density of about 3.10 gms./cm.$^3$, or higher and contains between 3% and 4% of free silicon.

In general, it is preferred to make the extrudable wet mix with silicon carbide particles of very fine size, because such a mix is easily worked. However, coarse particles of silicon carbide can also be employed in the mix, and tubular shapes can be produced by pressing or other methods of fabrication instead of by extrusion.

This process produces dense bodies of silicon carbide in a single firing step. It is rapid, simple, and convenient.

A process that involves two firing steps can also be employed to make dense silicon carbide bodies, according to the teachings in the copending patent application of K. M. Taylor, Serial No. 502,741, filed April 20, 1955. For example, a mix can be made as follows:

|  | Parts by weight |
| --- | --- |
| Silicon carbide, 100 grit mesh size (particle size range about 130 to 180 microns) | 55 |
| Silicon carbide, 220 grit mesh size (particle size range about 50 to 90 microns) | 15 |
| Silicon carbide, 3F grit mesh size (particle size range 15 to 45 microns, average about 25 microns) | 15 |
| Silicon carbide, 1000 grit mesh size (particle size range 2 to 20 microns, average about 7 microns) | 15 |
| Phenolic resin temporary binder | 2 |
| Pine oil | 10 |

This silicon carbide is a high purity type that is known in the trade as "green" silicon carbide. The above mix is formed at 5,000 to 10,000 pounds per square inch to make a closed end tube approximately 0.5 inch O.D., 0.35 inch I.D., and 20 inches long. The thus-formed closed end tube is oven-dried to remove volatiles of the temporary binder, and is then fired at a temperature of about 2300° C. in the normal atmosphere of a high frequency furnace, to drive off the residual volatile temporary binder and to recrystallize the silicon carbide. The resulting recrystallized silicon carbide tube has a porosity of from 25% to 30%. The free silicon content is about 5% or less, by weight.

This porous tube is soaked in furfural or furfuryl alcohol, and the saturated body is exposed to hydrogen chloride vapors to carbonize the furfural or furfuryl alcohol, after which the tube is again oven-dried to remove any residual volatile matter. The impregnation and carbonization steps should be repeated as necessary, to deposit in the pores of the porous tube an amount of carbon equivalent to about 90% by weight of the theoretical amount of carbon that is required to react with silicon to fill the pores to form a perfectly dense tube of silicon carbide. The amount of carbon so deposited can be in the range of 85% to 95% by weight of this theoretical amount.

The thusly prepared tube shape is then heated to about 2100° C. to 2300° C. on a graphite support in an induction furnace in the presence of silicon. The silicon penetrates the pores of the porous body and reacts with the carbon contained therein to form additional silicon carbide in the pores of the porous silicon carbide tube. The tube is held at 2300° C. or above for approximately one-half hour to allow time for the silicon carbide formed within the pores of the article to convert to the hexagonal crystalline form, and also to drive off residual unreacted silicon. Most of the residual silicon can also be removed by leaching the article with a mixture of nitric and hydrofluoric acids.

In general, the two-step process for making dense silicon carbide tubes involves forming recrystallized, porous silicon carbide tube shape, then impregnating the pores of the tube with a carbonizable material and carbonizing the same, or otherwise loading the pores of the porous tube with deposited carbon, and then heating the carbon-impregnated tube in the presence of silicon to cause the silicon to penetrate and react with the carbon in the pores of the tube to form additional silicon carbide.

A porous tube shape, of recrystallized silicon carbide, for impregnation with carbon in the two step process, may have a porosity in the neighborhood of 25% to 30%. In the two-step process, firing of a formed mix, such as is described above, at around 2300° C., results in a porous body in which the silicon carbide is held together by recrystallization, but it is not essential that recrystallizing temperatures be employed to form the porous tube. The molded tube can be bonded into a porous structure and fired at temperatures below those at which recrystallization takes place; and the resulting bonded shape can then be impregnated satisfactorily with carbon and subsequently siliconized to form dense tubes that can be used as thermocouple elements according to the present invention.

To load the porous tube with carbon in the two-step process, several carbonizable organic materials can be used to impregnate the porous structure. In addition to furfural and/or furfuryl alcohol, an organic resinous compound, such as a liquid phenol-formaldehyde resinous condensation product can be used. Also, the porous tube can be heated in the presence of a carbonaceous gas such as methane or acetylene, at a temperature at which the gas will break down and deposit carbon within the pores.

Siliconizing of the carbon-impregnated porous tube structure can also be accomplished by heating the impregnated shape at an elevated temperature of about 2000° C. in the presence of a source of elemental silicon such as silicon nitride, which will dissociate to provide elemental silicon, whereupon the silicon will penetrate the body and react with the carbon within the pores of the body to form silicon carbide. While penetration and reaction can be caused to take place in a relatively short time, in which case the thusly formed silicon carbide developed within the pores of the article is of the cubic crystalline habit, best results in obtaining tubes of extremely high density are obtained by holding the article at an elevated temperature of around 2100° C. to 2300° C. for a sufficient length of time to cause the interstitial silicon carbide, after it is formed, to convert to silicon carbide of the hexagonal crystalline habit. Moreover, the crystalline habit of the silicon carbide has a direct effect on the thermoelectric properties of the tube. Moreover, holding the article at a sustained high temperature also aids further recrystallization and promotes better bonding of the newly-formed silicon carbide with the original silicon carbide of the tube structure, and a consistent course of sustained high temperature treatment is desirable for producing tubes of consistent thermoelectric properties. Furthermore, heat treatment of the tube at such an elevated temperature further serves to volatilize any excess silicon.

A tube that is produced in either of the above manners has a positive thermoelectric characteristic relative to graphite, at temperatures above room temperature, and has a density as high as 3.00 and even as high as 3.05, and a free silicon content of about 5.0% by weight, or less. Its flexural strength is excellent. Its thermal conductivity is on the order of 293 B.t.u./sq. ft./in./hr./° F., at 1832° F., which is much superior to the thermal conductivity of many other refractory materials. Its oxidation and corrosion resistance are excellent. Its high density results in very low permeability. For example, a thin wall tube of 5/16" O.D. and 3/16" I.D. is substantially impervious to helium under 160 p.s.i pressure at room temperature.

The rod 11, that forms the second element of the thermocouple, preferably is a one-quarter inch diameter, porous, recrystallized silicon carbide rod. According to a preferred embodiment of the invention, this rod is made from "green" silicon carbide grain, of the high purity type used in making electrically conductive elements. A mix of this silicon carbide grain of different sizes, together with a phenolic resin temporary binder and pine oil, in the same sizes and proportions described above in connection with the preparation of the tube 12, by the two-step process, is extruded to form a one-quarter inch diameter rod, approximately 21" long. This rod is oven-dried to remove volatiles, and is fired at a temperature of about 2300° C. in the normal atmosphere of a high frequency furnace to drive off the residual volatile temporary binder, and to recrystallize the silicon carbide. The resulting recrystallized silicon carbide rod has a porosity of from 25% to 30%.

A closed-end tube, made by the one-step process described above, and a porous recrystallized rod, made as described in detail above, were assembled with a base as illustrated in FIG. 1 to form a thermocouple. This couple was used to obtain millivolt readings in a silicon carbide furnace. The couple gave quite high millivolt readings. A reading of 436 millivolts was obtained, for example, when an optical pyrometer indicated a furnace temperature of 2210° C. at the couple. As this furnace cooled, additional readings were taken, to provide the calibration curve shown in FIG. 2. This curve is based on the following readings, among others:

| Degrees C. as determined by an optical pyrometer: | Millivolts |
|---|---|
| 992 | 195.4 |
| 1040 | 215.6 |
| 1204 | 243 |
| 1407 | 275.4 |
| 1565 | 338 |
| 2210 | 436 |

The outer tube of dense silicon carbide is substantially impervious and therefore protects the porous inner member against oxidation, erosion, corrosion, and other damaging conditions. While this tube of dense silicon carbide is preferred for use as one element of the thermocouple, it can also be used as a protection tube for a thermocouple made of metallic elements. Thermocouples in which a tube of the dense silicon carbide is the outer element, that is interposed between the hot environment and the hot junction of the thermocouple; and thermocouples of the metallic or other type that are inserted in an outer protection tube of the dense silicon carbide, can be used for short immersions in molten iron at 1600° C. in molten copper, and for similar applications.

Thermocouple elements that are made from the same batch of silicon carbide have excellent consistency as to their thermoelectric characteristics, and frequently, the calibration lines for different thermocouples, in which both elements are made of silicon carbide and in which the elements are made from the same respective batches, fall within 1% of each other.

Dense silicon carbide is substantially impervious to gases, and a thermocouple constructed according to the preferred, illustrated embodiment of the invention is particularly desirable for use for measuring the temperatures of hot, erosive, or corrosive gas streams. Porous members of silicon carbide, such as the rod element of the thermocouple, are more susceptible to attack by hot gases, since the gas can attack the rod element internally because of its porous structure, as well as externally. When a dense silicon carbide tube is interposed between the porous rod and the hot stream of corrosive or erosive gas, the rod is protected against attack.

The advantages of using a closed-end tube of dense silicon carbide as one element in a thermocouple can also be obtained where the rod element of the couple is made from a material other than silicon carbide, such as, for example, graphite. When a tube made as described above is used with a graphite rod as a thermocouple, the tube protects the graphite against oxidation and provides a couple that is effective for use at high temperatures. Under non-oxidizing conditions, a couple of this type can be used to measure temperatures up to about 2400° C., and under extremely favorable conditions, the thermocouple can be used for very short periods of time at temperatures of 2700° C., at which temperature millivolt readings on the order of 820 millivolts are obtained. Since silicon carbide decomposes to graphite at temperatures of 2500° C. and above, any exposure to temperatures more elevated than 2500° C. must necessarily be brief. Even though some decomposition may take place, there remains a couple of silicon carbide and graphite that produces a thermoelectric force.

To demonstrate the impervious character of a thermocouple tube made from dense silicon carbide, a thermocouple with a tube element made of dense silicon carbide and with a graphite rod inner element can be employed to measure the temperature gradients in a high intensity arc furnace. In one such demonstration of the invention, temperature measurements were made at six horizontal positions in the furnace. These positions corresponded to distances from ⅞" to 7" from the center of the arc. The readings obtained were as follows:

| Distance from the Center of the Arc | Temperature, Degrees C. | Time of Furnace Run, sec. |
| --- | --- | --- |
| ⅞" | 2,280 | 70 |
| 1" | 2,060 | 35 |
| 1½" | 1,540 | 50 |
| 3½" | 1,260 | 60 |
| 6½" | 810 | 60 |
| 7" | 680 | 60 |

The tube withstood the erosion and thermal shock conditions of this test quite well. There was no indication of any fracture or cracking or breakage caused by thermal shock. The tube tip eroded slightly when it was placed ⅞" from the center of the arc; however, this erosion did not appear to be excessive considering the temperature range and the high velocity of the gas to which the tube was subjected.

There are several available varieties of silicon carbide that can be used in making the thermocouple elements. The most common varieties are the "green" grade of silicon carbide and the "black" grade of silicon carbide.

The "black" grade of silicon carbide is the more common of the two color varieties, and is generally acceptable for the manufacture of abrasives and refractory products, where hardness and/or resistance to corrosion or erosion at high temperatures are the primary requirements. The black variety of silicon carbide is made in the well known conventional silicon carbide resistance furnace utilizing the customary raw batch charge of silica sand and coke or other source of carbon, together with recovered mix from previous furnace runs.

The "green" variety of silicon carbide is made in a silicon carbide resistance furnace in the same procedural operation by which the black variety of silicon carbide is made, with the exception that no recovered mix from previous furnace runs is incorporated in the raw batch charge, and added precautions are taken against the introduction of impurities into the furnace mix. The resultant green variety of silicon carbide is of high purity and is readily distinguishable in appearance from the black variety of silicon carbide.

The common commercial variety of silicon carbide, that is made in tonnage quantities and used for refractory and abrasive products, is the black variety and is of the hexagonal crystalline habit. The green variety is also produced in tonnage quantities, but is more commonly used for electrical resistance elements. In a given silicon carbide furnace, regardless of the variety of silicon carbide produced, different forms of the product are obtained from different parts of the furnace crust. Usually, the silicon carbide is in the form of a porous aggregate of crystals, which are more or less perfectly developed in regard to external form; and in the usual silicon carbide furnace, for mass production purposes, every effort is made to produce material that has this open crystalline character. However, under certain conditions of furnace operation, it is possible to produce a silicon carbide in the form of more densely compacted masses that are practically devoid of external crystalline form. Silicon carbide in this dense or compact physical form is characterized by a higher apparent density than the more commonly made material of open crystalline character that is more porous.

There is therefore a form of the green crystalline carbide having open crystalline character and a degree of porosity, and another form that is practically devoid of external crystalline character and that is more densely compacted. The same is true for the black variety of silicon carbide. Each of these forms has different thermoelectric properties. Moreover, by the use of controlled impurities or additives in the furnace raw batch, still further variation in the thermoelectric properties of silicon carbide can be obtained.

Further to demonstrate the invention, additional thermocouples were prepared. In making the following thermocouples, both thermocouple elements were prepared in rod form, and their ends were abutted to form a hot junction.

*Example 2*

A first rod was made by extruding a mix containing a black grade of silicon carbide of the type that is usually employed for lightning rods and electrical resistors, and a small amount of temporary binder. This grade of silicon carbide is well crystallized, and a representative sample, taken from a clean fraction passed through a 28 mesh sieve, has a color count in which a minimum of about 98% of the particles are black. This grade of silicon carbide is further characterized by a minimum content of silicon carbide of 97.00% by weight, and by a maximum amount of free silicon on the surface of the silicon carbide particles of 0.75% by weight. The extruded rod was fired to recrystallize the silicon carbide.

A second rod was then extruded from a mix containing a different grade of silicon carbide in a temporary binder. This grade of silicon carbide was of the black variety that is ordinarily used for making abrasive wheels. This variety of silicon carbide is well crystallized, and a representative sample is characterized by a minimum silicon carbide content of 96.50% by weight, and maximum amount of: free carbon, 0.75%; water, 0.50%; and free silicon on the surface of the silicon carbide particles, 0.75%. This second extruded rod shape was fired to recrystallize the silicon carbide, to make a second porous, self-bonded rod.

The first rod had a positive thermoelectric characteristic relative to graphite at temperatures above room temperature. The second rod had a negative thermoelectric characteristic relative to graphite at temperatures above room temperature. These two rods, when abutted together, gave excellent thermocouple action.

*Example 3*

Another rod was made in the same manner as the first rod in Example 2 above.

A second rod was then prepared from a rod shape containing particles of a green variety of silicon carbide of very high purity. A color count on a clean fraction, that passed through a 28 mesh sieve and was retained on a 34 mesh sieve, indicated that a maximum of 10% by weight of the particles were black and smoky, and that a minimum of 35% by weight of the particles were light green. All of the silicon carbide particles were well crystallized and were of characteristically fine particle size. The fraction was further characterized by a minimum silicon carbide content of 97.50%, and the free silicon on the surface of the silicon carbide did not exceed 0.25%. The recrystallized, porous rod made from this silicon carbide had a more negative thermoelectric characteristic than the first rod.

When these two rods were abutted and their junction was used as the hot junction of a thermocouple, excellent thermocouple action was obtained.

It is also possible to make an effective temperature measurement device, for use with molten metals, from a pair of rods of silicon carbide of different thermoelectric characteristics. The rods can be held in spaced apart relation in an insulating clamp, so that their opposite ends can be immersed in the molten metal. The metal provides the hot junction. Preferably, to produce the greatest swing on the potentiometer, one of the silicon carbide rods has a positive thermoelectric characteristic relative to graphite at temperatures above room temperature and the other silicon carbide rod has a negative thermoelectric characteristic relative to graphite at temperatures above room temperature. However, the device can also be made from a pair of silicon carbide rods that have different thermoelectric characteristics but that are both positive, or both negative, relative to graphite at temperatures above room temperature.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

We claim:

1. A thermocouple comprising two thermoelements, one of said thermoelements consisting essentially of silicon carbide having a positive thermoelectric characteristic relative to graphite at temperatures above room temperature and the other of said thermoelements consisting essentially of silicon carbide having a negative thermoelectric characteristic relative to graphite at temperatures above room temperature.

2. A thermocouple as claimed in claim 1 and in which the first thermoelement has a density of at least 3.0.

3. A thermocouple for measuring the temperature of an environment comprising two thermoelements, one of said thermoelements consisting essentially of silicon carbide having a positive thermoelectric characteristic relative to graphite for temperatures above room temperature and the other of said thermoelements consisting essentially of silicon carbide having a negative thermoelectric characteristic relative to the first-mentioned thermoelement, said first-mentioned thermoelement being interposed between said environment and said second-mentioned thermoelement.

4. A thermocouple as claimed in claim 3 and in which the first-mentioned thermoelement has a density of at least 3.0.

5. A thermocouple for measuring the temperature of an environment comprising at least two thermoelements, one of said thermoelements consisting essentially of silicon carbide having a density of at least about 3.0 and the other consisting essentially of silicon carbide and being shielded from said environment by said first-mentioned thermoelement.

6. A thermocouple for measuring the temperature of an environment comprising two thermoelements, both of which consist essentially of silicon carbide, and one of which consists essentially of silicon carbide having a density of at least about 3.00 and having a positive thermoelectric characteristic relative to graphite at temperatures above room temperature and which is interposed between said environment and the other of said thermoelements, said other thermoelement having a negative thermoelectric characteristic relative to graphite at temperatures above room temperature.

7. A thermocouple for measuring the temperature of an environment comprising two thermoelements both of which consist essentially of silicon carbide and a first of which consists essentially of silicon carbide of hexagonal crystalline habit and having a density of at least about 3.00 and a positive thermoelectric characteristic relative to graphite at temperatures above room temperature, and which is interposed between said environment and the other of said thermoelements, said other thermoelement consisting essentially of self-bonded, recrystallized silicon carbide having a porosity on the order of from about 25% to about 30% and having a negative thermoelectric characteristic relative to graphite at temperatures above room temperature.

8. A thermocouple comprising a first thermoelement in the form of a closed end tube and a second thermoelement in the form of a rod disposed coaxially in said tube and in electrical contact therewith only at the closed end thereof to provide a hot junction, said first thermoelement consisting essentially of silicon carbide of hexagonal crystalline habit, having a density of at least about 3.00, and containing less than about 5% free silicon, and characterized by a positive thermoelectric characteristic relative to graphite at temperatures above room temperature, and said second thermoelement consisting essentially of a porous, recrystallized silicon carbide body having a negative thermoelectric characteristic relative to graphite at temperatures above room temperature.

9. A thermocouple comprising a first thermoelement in the form of a closed end tube, a second thermoelement in the form of a rod, means for holding said rod coaxially in said tube with one end of said rod abutted against the end face of said tube and in spaced, electrically insulated relation over their axial lengths to provide a hot junction at the closed end face of said tube, means for moving said rod axially in said tube and for holding said rod in any axially adjusted position to press said rod end against the end face of said tube at different adjusted pressures, said tube consisting essentially of silicon carbide of hexagonal crystalline habit containing less than about 5% by weight of free silicon, and having a density of at least about 3.00 and a positive thermoelectric characteristic relative to graphite at temperatures above room temperature, and said rod consisting essentially of a porous, recrystallized silicon carbide body having a negative thermoelectric characteristic relative to graphite at temperatures above room temperature.

References Cited in the file of this patent

UNITED STATES PATENTS

| | | |
|---|---|---|
| 2,094,102 | Fitterer | Sept. 28, 1937 |
| 2,431,327 | Geiger | Nov. 25, 1947 |

FOREIGN PATENTS

| | | |
|---|---|---|
| 633,828 | Germany | Aug. 8, 1936 |
| 191,712 | Great Britain | July 5, 1923 |

OTHER REFERENCES

Metal Progress, October 1945, page 652, 136–4.77.